United States Patent
MacKenzie

(10) Patent No.: US 12,327,496 B2
(45) Date of Patent: Jun. 10, 2025

(54) METHOD OF DECORATIVELY SCARIFYING PLANT LEAVES

(71) Applicant: Hortech, Inc., Nunica, MI (US)

(72) Inventor: David S. MacKenzie, Nunica, MI (US)

(73) Assignee: Hortech, Inc., Nunica, MI (US)

( * ) Notice: Subject to any disclaimer, the term of this patent is extended or adjusted under 35 U.S.C. 154(b) by 0 days.

(21) Appl. No.: 18/336,466

(22) Filed: Jun. 16, 2023

(65) Prior Publication Data

US 2024/0054924 A1 Feb. 15, 2024

Related U.S. Application Data

(60) Provisional application No. 63/371,147, filed on Aug. 11, 2022.

(51) Int. Cl.
*G09F 19/00* (2006.01)
*A01G 7/00* (2006.01)

(52) U.S. Cl.
CPC ........... *G09F 19/00* (2013.01); *A01G 7/00* (2013.01)

(58) Field of Classification Search
CPC .................................. A01K 7/00; G09F 19/00
See application file for complete search history.

(56) References Cited

U.S. PATENT DOCUMENTS

| | | | | |
|---|---|---|---|---|
| 5,480,308 A | * | 1/1996 | Boundy | G09B 23/38 434/296 |
| 5,660,747 A | * | 8/1997 | Drouillard | B23K 26/08 219/121.69 |
| 6,172,328 B1 | | 1/2001 | Jones et al. | |
| 6,180,914 B1 | | 1/2001 | Jones et al. | |
| 6,874,419 B2 | * | 4/2005 | Harris | B41M 1/30 347/213 |
| 9,265,260 B1 | * | 2/2016 | Drouillard | C05F 11/00 |
| 10,750,672 B2 | * | 8/2020 | Buelow | F21V 11/00 |
| 10,830,671 B2 | * | 11/2020 | Sercel | G01N 35/00732 |
| 11,178,823 B2 | * | 11/2021 | Drouillard | C05G 3/60 |
| 11,191,278 B2 | * | 12/2021 | Drouillard | A01N 63/60 |

OTHER PUBLICATIONS

Avalon, D. P. (Feb. 10, 2018). Avoid the Hoya Kerri Plant single leaf Valentines day Gimmick. Retrieved from Youtube: https://www.youtube.com/watch?v=QJcuggBffJw (Year: 2018).*
Usa, T. L. (Mar. 21, 2018). Trotec Laser: Fall Leaf Engraving. Retrieved from YouTube: https://www.youtube.com/watch?v=Q5NM0OBpB44 (Year: 2018).*
Prickly pear cactus with a Halloween like carved face; alamy.com. Apr. 22, 2011, Guillermo Lopez Barrera. https://www.alamy.com/stock-photo-prickly-pear-cactus-with-a-halloween-like-carved-face-122420916.html (Year: 2011).*

(Continued)

*Primary Examiner* — Monica L Perry
*Assistant Examiner* — Aaron M Rodziwicz
(74) *Attorney, Agent, or Firm* — Price Heneveld LLP

(57) ABSTRACT

Methods of marking living leaf tissue and apparatuses for effecting such marking are disclosed, and may include orienting a plant such that the living leaf tissue is in a marking position, retaining the living leaf tissue in the marking position, and marking the living leaf tissue with a mark applicator, wherein marking the living leaf tissue introduces a permanent deformation in the living leaf tissue.

20 Claims, 10 Drawing Sheets

(56) References Cited

OTHER PUBLICATIONS

Why Does it Bother Me That People Feel the Need to Carve Graffiti on Plants; thehouseplantguru.com. Aug. 3, 2021, Lisa Steinkopf. https://thehouseplantguru.com/2021/08/03/why-does-it-bother-me-that-people-feel-the-need-to-carve-graffiti-on-plants-2/ (Year: 2021).*
"Hoya Kerrii_Care: Expert Grow Tips and 1 Trap to Avoid!" Web:<https://www.ohiotropics.com/2020/06/19/hoya-kerrii-care/>. 2020; Title; first page, first paragraph.
ISA/US, Commisioner for Patents; International Search Report; Oct. 9, 2023; entire document.

* cited by examiner

METHOD OF DECORATIVELY SCARIFYING PLANT LEAVES

CROSS REFERENCE TO RELATED APPLICATIONS

This application claims the benefit of U.S. Provisional Patent Application No. 63/371,147, filed on Aug. 11, 2022, entitled "METHOD OF DECORATIVELY SCARIFYING PLANT LEAVES," the entire disclosure of which is incorporated herein by reference.

BACKGROUND

The aspects as disclosed and described herein relate to a method of marking living leaf tissue of a plant.

BRIEF SUMMARY

One embodiment as shown and described herein may include a method of marking living leaf tissue of a plant that includes providing a *Hoya* plant, orienting the *Hoya* plant such that the living leaf tissue of the *Hoya* plant is in a marking position, retaining the living leaf tissue in the marking position, providing a mark applicator that includes a laser, and marking the living leaf tissue with the laser, wherein marking the living leaf tissue introduces a permanent deformation in the living leaf tissue, and wherein the laser deforms the living leaf tissue with an ultraviolet light to introduce the permanent deformation.

Yet another embodiment as shown and described herein may further or alternatively include a method of marking living leaf tissue of a plant that includes selecting a plant, wherein the plant is a succulent plant, orienting the plant such that the living leaf tissue is in a marking position, retaining the living leaf tissue in the marking position, providing a mark applicator, and marking the living leaf tissue with the mark applicator, wherein marking the living leaf tissue introduces a permanent deformation in the living leaf tissue.

Another embodiment as shown and described herein may further or alternatively include a method of marking living leaf tissue of a plant that includes providing a *Hoya kerrii* plant, loading the *Hoya kerrii* plant into a marking apparatus, orienting the *Hoya kerrii* plant such that the living leaf tissue of the *Hoya* plant is in a marking position, retaining the living leaf tissue in the marking position, providing a laser, and marking the living leaf tissue with a laser light applied by the laser, wherein marking the living leaf tissue introduces a permanent deformation of a surface of the living leaf tissue.

The present disclosure provides a method of marking living leaf tissue of a plant that is accomplished in a manner that does not cause the plant to die or become sick or diseased. For example, the method of marking living leaf tissue of a plant can introduce a permanent deformation in the plant (e.g., in the leaf tissue). In one specific, non-limiting, example the permanent deformation can be introduced to a cuticle cell, a cuticle layer, an epidermal cell, an epidermal layer, a mesophilic cell, and/or a mesophilic layer.

These and other features, advantages, and objects of the embodiments as disclosed herein will be further understood and appreciated by those skilled in the art by reference to the following specification, claims, and appended drawings.

DETAILED DESCRIPTION

Figure 1:
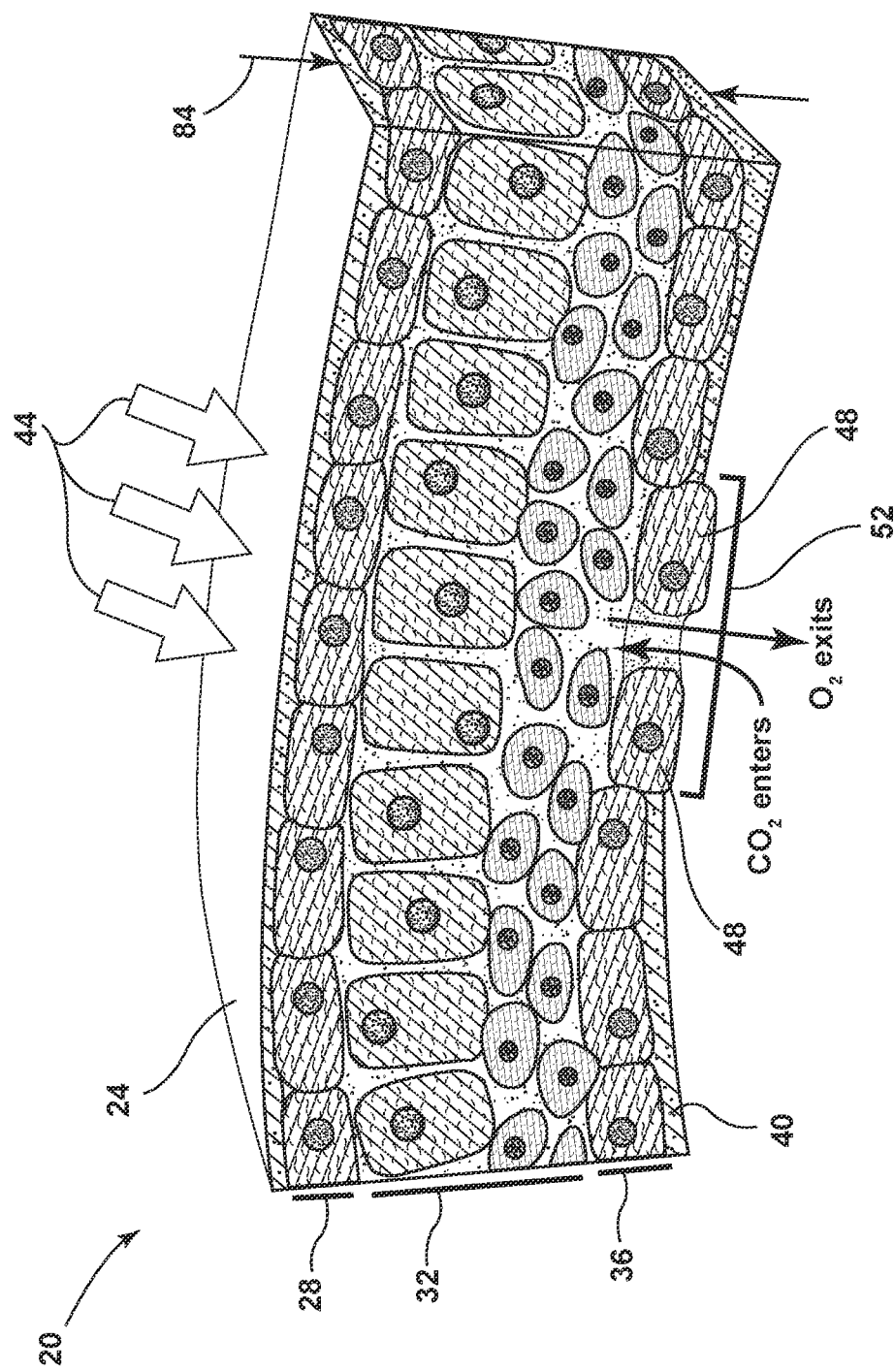
FIG. 1 is a cross-sectional representation of a plant leaf illustrating various layers thereof, according to one example.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIG. 1, a plant leaf 20 is shown in a cross-sectional representation. The plant leaf 20 includes a first cuticle layer 24, a first epidermal layer 28, a mesophilic layer 32, a second epidermal layer 36, and a second cuticle layer 40. In some examples, the first cuticle layer 24 may alternatively be referred to as an upper cuticle layer and the first epidermal layer 28 may alternatively be referred to as an upper epidermal layer. Similarly, in various examples, the second epidermal layer 36 may alternatively be referred to as a lower epidermal layer and the second cuticle layer 40 may alternatively be referred to as a lower cuticle layer. In some examples, the distinction between upper and lower may be indicative of a directionality of incident light 44 (e.g., sunlight) contacting the plant leaf 20. The plant leaf 20 may include guard cells 48 that define stoma 52. The stoma 52 can be moved between an open position and a closed position by the guard cells 48 associated therewith. The stoma 52 can be moved between the open position and the closed position based on gas exchange and/or water retention needs of the plant leaf 20 and/or a plant that is associated with the plant leaf 20. For example, the stoma 52 may remain in the open position during daylight hours when photosynthesis is occurring and the stoma 52 may transition to the closed position during nighttime hours.

Figure 2:
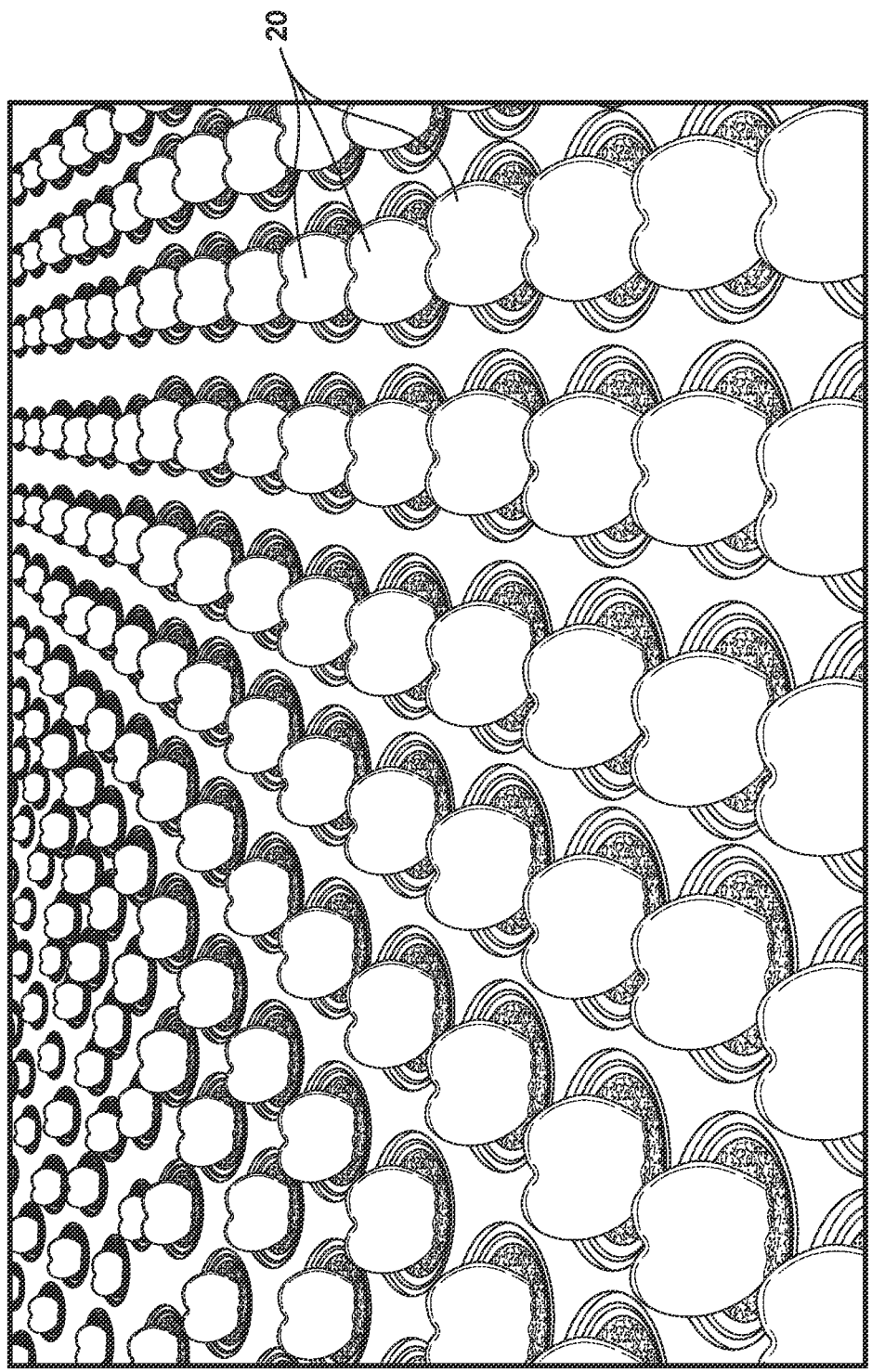
FIG. 2 depicts a multitude of plant leaves in a growing environment.
Figure 3:
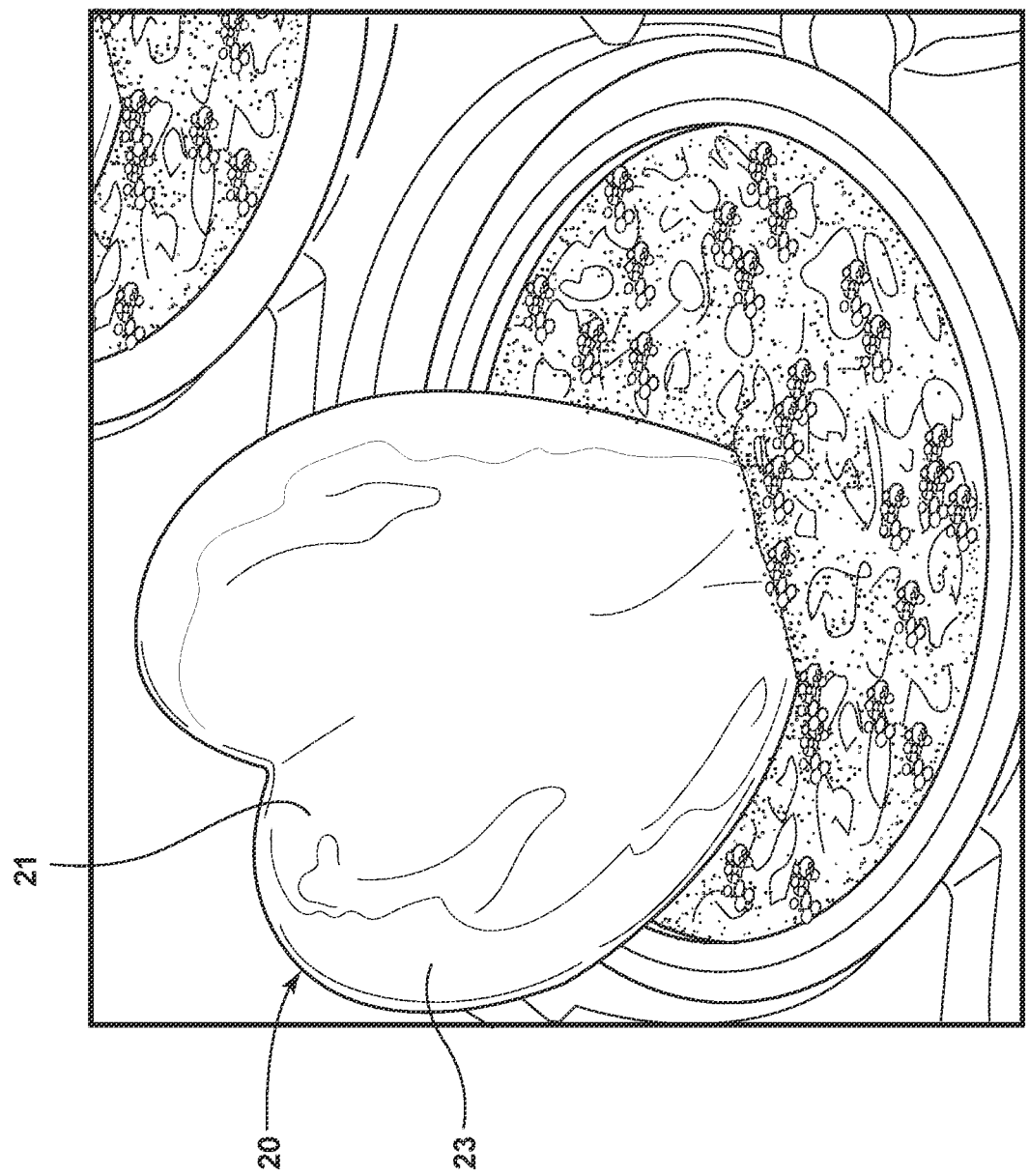
FIG. 3 is a front perspective view of the plant leaf illustrating a white variegation variety.

Referring now to FIGS. 2 and 3, the plant leaf 20 is depicted according to various examples. The plant leaf 20 preferably includes a leaf from a succulent plant, more preferably includes a leaf from the *Hoya* genus, even more preferably includes a leaf from a *Hoya* species including *kerrii, australis, gracillis, lucanosa, obovata, parasitica, pubicalyx* and *verticillate*, and most preferably includes a *Hoya kerrii* leaf or any variety thereof. In the depicted examples, the plant leaf 20 is a *Hoya kerrii* leaf. FIG. 2 shows one variety of the *Hoya kerrii* in a variety of pots that include soil. FIG. 3 shows another variety of the *Hoya kerrii* in a pot that contains soil, where this variety includes a green central portion 21 and white variegation along edges 23 thereof. The term "variegation" can broadly refer to a plant that has an appearance with differently colored zones in the leaves, stems, and/or fruit of the plant. *Hoya kerrii* are also known as the Valentine plant or the sweetheart wax plant. The *Hoya kerrii* is a subtropical plant with a substantially flat, or substantially planar, leaf that is also substantially heart-shaped. The leaves of the *Hoya kerrii* can be induced to form roots that allow the *Hoya kerrii* leaves to persist as a "living leaf" that grows indefinitely and independently of any stem structure or flowers. Accordingly, the *Hoya kerrii* may be both the plant leaf 20 and the plant that is associated with the plant leaf 20 once the roots have been induced to form. Few plant leaves can be induced to form roots in the manner of the *Hoya kerrii* leaves. The *Hoya kerrii* leaves are particularly desirable from a marketability standpoint due to their heart-shaped appearance. The *Hoya kerrii* can be offered for sale as "living hearts" in a variety of gift-giving scenarios.

Altering an appearance of the plant leaf 20 can result in an increase in the marketability of the plant leaf 20. Such an increase in the marketability of the plant leaf 20 upon altering its appearance can apply to any plant, including, but not limited to, succulent plants and/or the *Hoya kerrii*. It is contemplated that any plant that can receive a permanent deformation (e.g., an injury and/or a scar) without becoming sick or diseased can be marked in the manner discussed herein. The deformation, scarring, alteration, and the like, of the plant, plant leaf and/or layer of the plant leaf may be accomplished via various methods and apparatus, including but not limited to, abrasion by a physical tool such as a rotary tool, a drill, a chisel, a blade, a knife, a CNC machine, a milling machine, needling or pricking with a needle, and the like, increasing the temperature of a localized area or layer via a laser, branding, conduction heating, convection heating, and the like, and surface abrasion via medium blasting either with or without the use of a template, as further discussed herein.

Figure 4:
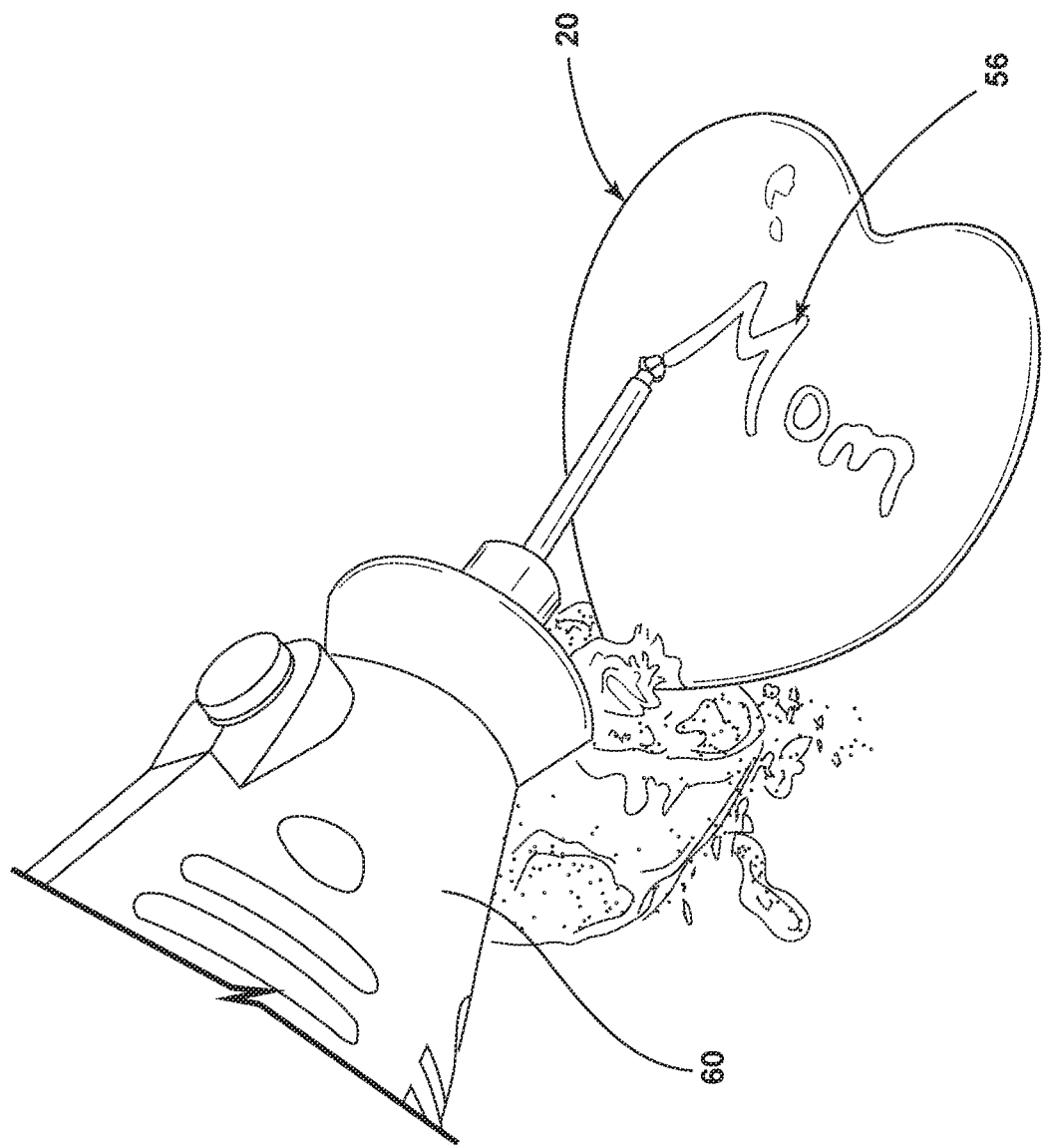
FIG. 4 is a side perspective view of the plant leaf illustrating a mark applicator and an indicia, according to one example.

Referring to FIG. 4, the plant leaf 20 is shown with indicia 56 that can be used as a template for applying a marking to the plant leaf 20. For example, the indicia 56 can be, but is not limited to, alphanumeric characters, a portrait, a photograph, an image, a design, or any other desired shape or combination of shapes. In the depicted example, the indicia 56 used forms the word "Mom" and could be marked into the plant leaf 20 as a gift for Mother's Day. Similarly, the indicia 56 used could form the word "Dad" for Father's Day. In alternative examples, the indicia 56 and/or the marking can form a greeting, a family photo, a photo of a loved one, a design, an anniversary date, a number associated with an anniversary number, and so on. In short, the indicia 56 and/or the marking can take any form that is desirable to a consumer. Alternative uses may include marking plants for scientific tracking of horticulture experiments, thereby reducing the chances of mislabeling selected plants.

A mark applicator 60 is also shown in FIG. 4 according to one example. In the depicted example, the mark applicator 60 is a physical tool. That is, the physical tool can be used to cause abrasion to the plant leaf 20 that results in permanent deformation of the plant leaf 20. The physical tool can be a rotary tool, such as a handheld drill or rotary tool, which is equipped with a fitting that can be employed in causing abrasion to the plant leaf 20. In some examples, the physical tool can include a sharpened edge. For example, the physical tool may be a drill bit, a chisel, a screwdriver, a blade, or a knife. In some examples, the physical tool may be a CNC machine or a milling machine.

Figure 5:
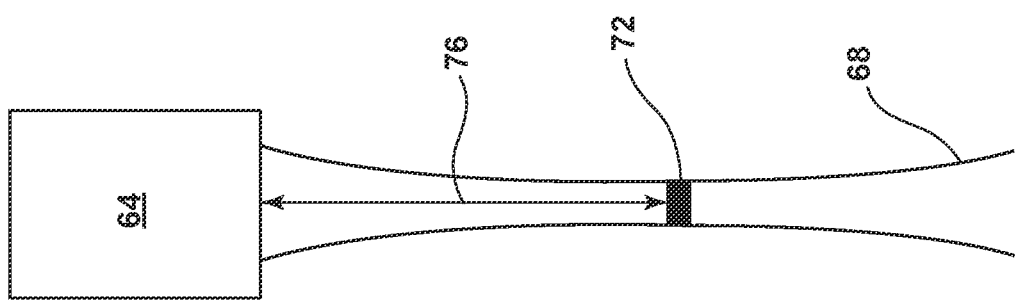
FIG. 5 is a schematic view of a mark applicator comprising a laser.

In some examples, the mark applicator 60 may induce an increase in a local temperature of a region of the living plant and/or the plant leaf 20 to effect marking of the living leaf tissue. For example, the mark applicator 60 may be a thermal element that is heated and then physically contacted with the living leaf tissue that is to-be marked (e.g., branding). Alternatively, the increase in the local temperature of the region of the plant and/or the plant leaf 20 that is to be marked may be induced by absorption of electromagnetic radiation (e.g., visible light). For example, a laser 64 (see FIG. 5) may be employed to induce the increase in the local temperature of the region of the plant and/or the plant leaf 20 that is to be marked. A wavelength of a beam or light 68 generated by the laser 64 can be chosen such that the wavelength of light is absorbed by a component of the plant and/or the plant leaf 20. For example, the wavelength of light may be chosen to correspond to one or more chlorophylls (e.g., a wavelength of about 400-500 nm and/or about 600-700 nm), correspond to one or more of the cuticle layers (e.g., the first cuticle layer 24 and/or the second cuticle layer 40), correspond to the mesophilic layer 32, correspond to one or more of the epidermal layers (e.g., the first epidermal layer 28 and/or the second epidermal layer 36), and/or any other component of the plant leaf 20.

In examples that employ the laser 64 as the mark applicator 60, various properties of the laser 64 and/or a path of a beam 68 (see FIG. 5) of the laser 64 can be chosen to provide a degree, depth, and/or location (i.e., in a given layer(s) of the plant leaf 20) of marking that is desired. For example, a focal point 72 (see FIG. 5) of the light or beam 68 of the laser 64 and/or a focal length 76 of the laser 64 may be set and/or chosen for a desired depth within the plant leaf 20. In some examples, the focal length 76 of the laser 64 can be chosen to affect a plurality of layers of the plant leaf 20 with a predetermined intensity of light simultaneously. Similarly, an intensity of the beam 68 of the laser 64 and/or a duration of exposure of the plant leaf 20 to the beam 68 of the laser 64 may be chosen to acquire the desired degree, depth, and/or location of the marking. Preferably, a laser within the ultraviolet wavelength range of between 150 nm and 400 nm is utilized, more preferably of within a wavelength range of between 250 nm and 375 nm, and most preferably at a wavelength of about 355 nm. Of course, other types of lasers and wavelength ranges may be utilized, including diode lasers, fiber lasers, gas lasers, solid-state lasers and $CO_2$ lasers.

Figure 6:
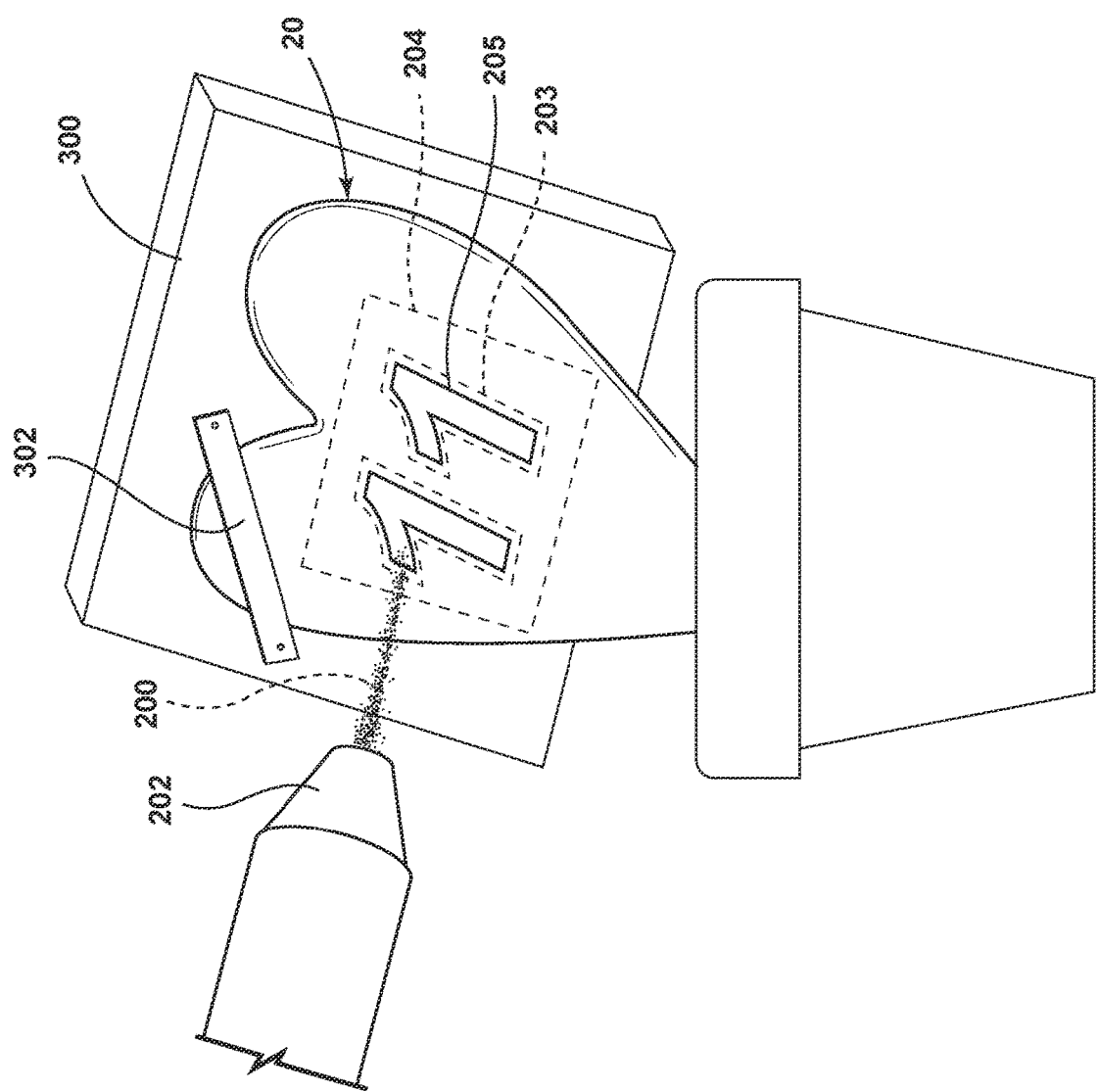
FIG. 6 is a front perspective view of a marked plant leaf ten months after marking, according to one example.

In an example that employs the use of a blasting media, a media delivery unit such as a "sand blaster" is utilized, where a media 200 (FIG. 6) is delivered via a gun 202 of the sand blaster. Various medias may be utilized to deform the plant leaf 20 and/or layers thereof, including glass, sand, plastic, metal, and biomaterials, such as walnut shells, and the like. Preferably, the blasting media 200 includes glass beads, and more preferably, glass beads of between 40 and 80 US sieve in size. In one embodiment, a template 204 that includes the preselected indicia or marking pattern 203 to provide the marking 205 may be used to cover portions of the outer layer of the plant leaf 20, thereby protecting the covered layers from abrasion during the abrasion process. The template 204 may be temporarily affixed to an outer surface of the plant leaf via an adhesive or clamping arrangement or may be placed in close proximity of the outer layer of the plant leaf 20 without physically attaching the template 104 to the plant leaf 20. Further, the duration of time of the application of the blasting media 200 to the layer(s) of the plant leaf 20 may be preselected so as to adequately deform or scar the layer(s) of the plant leaf 20 so as to provide a clear and lasting marking 205 without unnecessarily damaging the plant leaf 20. In one embodiment, the duration of the time for application of the blasting media 200 to the layer(s) of the plant leaf 20 is preferably less than or equal to about 5 seconds, more preferably of less than or equal to about 3 seconds, and more preferably of less than or equal to about 1 second, and may include the use of glass beads, where the glass beads may be between 40 and 80 US sieve in size. In the example illustrated in FIG. 6, the plant leaf 20 may be secured to support 300 which is part of an overall marking apparatus, where the plant leaf 20 is secured to the support 300 via a retainer 302 which may include an elastic strap.

Figure 7:
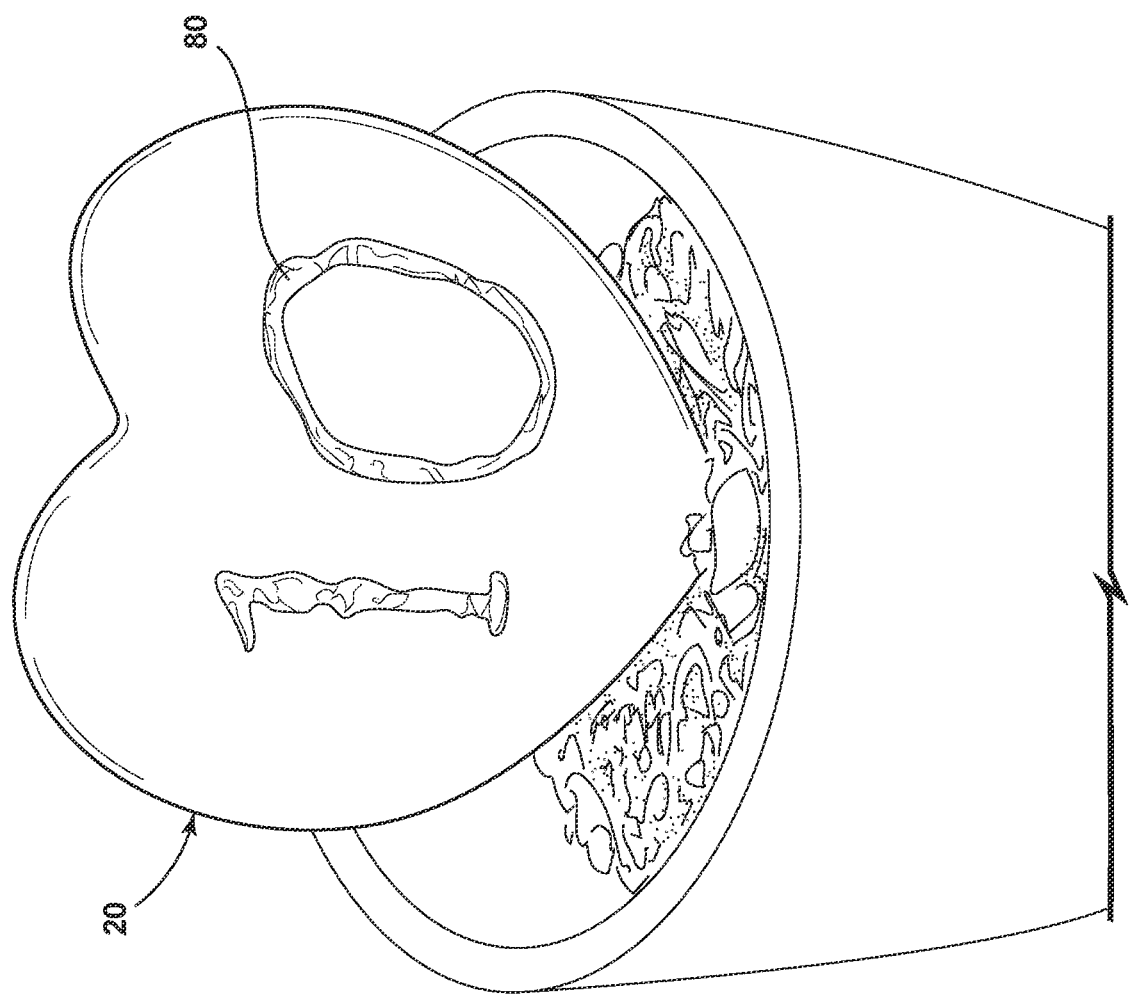
FIG. 7 is a front perspective view of a marked plant leaf ten months after marking.
Figure 8:
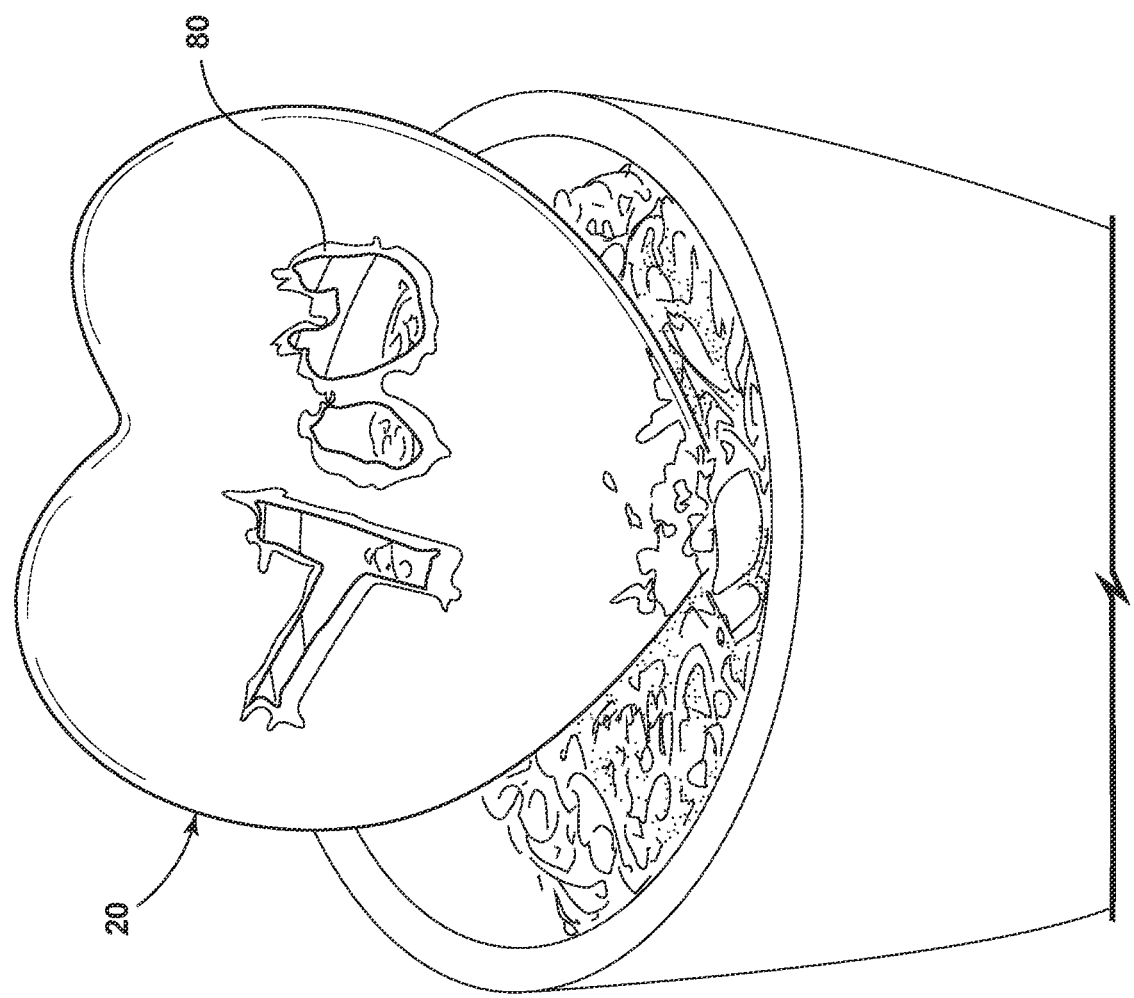
FIG. 8 is a front perspective view where the marking extends through a full thickness of the plant leaf.

Referring now to FIGS. 7 and 8, examples of the plant leaf 20 are shown ten months after application of a marking 80. Each of the markings 80 demonstrate that the methods of marking living leaf tissue of a plant that are discussed herein can be accomplished in a manner that does not cause the plant to die or become sick or diseased. In the example depicted in FIG. 7, a permanent deformation was induced to the plant leaf 20 in the shape of the number ten (e.g., to represent an anniversary or birthday). In the example depicted in FIG. 8, the cuticle layer (e.g., the first cuticle layer 24), the epidermal layer (e.g., the first epidermal layer 28), and the mesophilic layer 32 were damaged and given an opportunity to heal as a result of cultivating the plant leaf 20 (e.g., watering, providing ample sunlight, and/or fertilizing). In the example depicted in FIG. 8, the marking 80 was made by causing a permanent deformation that extended through an entirety of a thickness 84 (see FIG. 1) of the plant leaf 20. In the example depicted in FIG. 8, the word "you" was cut into the plant leaf 20 by a physical tool such that the first cuticle layer 24, the first epidermal layer 28, the mesophilic layer 32, the second epidermal layer 36, and the second cuticle layer 40 were each removed from the region of the marking 80. After applying the marking 80 shown in FIG. 8, the plant leaf 20 was given an opportunity to heal as a result of cultivating the plant leaf 20 (e.g., watering, providing ample sunlight, and/or fertilizing).

Figure 9:
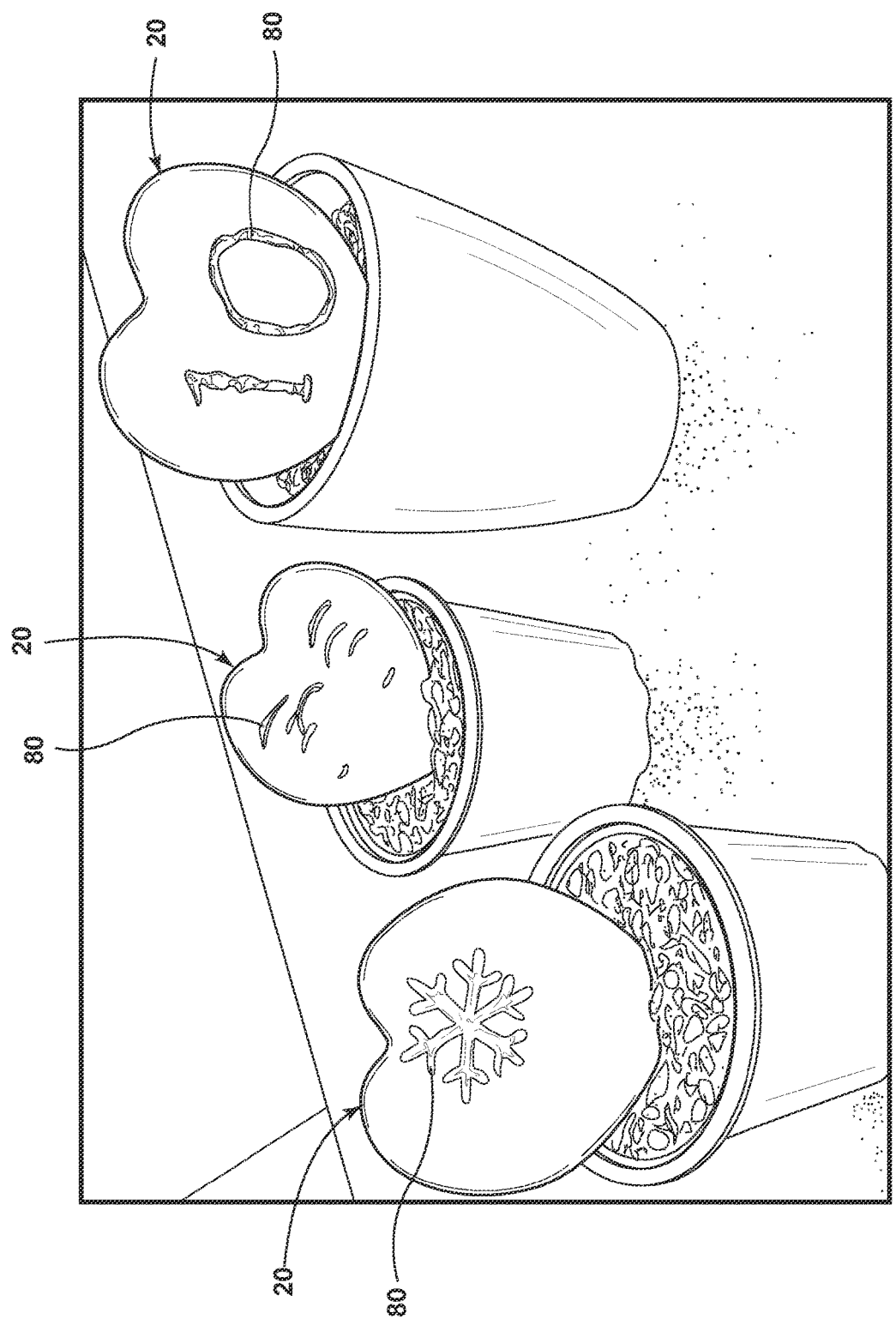
FIG. 9 is a front perspective view of a plurality of marked plant leaves, according to various examples of the marking.

Referring to FIG. 9, a plurality of the plant leaves 20 are shown according to various examples of the markings 80 that may be applied. As noted above, the marking 80 that is applied to the plant and/or the plant leaf 20 may take any shape that is desirable to a consumer. Accordingly, the present disclosure is not limited to a given shape or classification of the marking(s) 80. It is contemplated that the marking 80 that is applied to a first side of the plant leaf 20 may differ from the marking 80 applied to a second side of the plant leaf 20. For example, the first side of the plant leaf 20 may receive a first marking and the second side of the plant leaf 20 may receive a second marking. The first side of the plant leaf 20 may correspond with the nomenclature employed with reference to FIG. 1. For example, the first side of the plant leaf 20 may correspond with the first cuticle layer 24 (e.g., a front) and the second side of the plant leaf 20 may correspond with the second cuticle layer 40 (e.g., a back). In one specific example, the first side of the plant leaf 20 may be marked with a portrait, a photograph or a caricature of a person and the second side of the plant leaf 20 may be marked with identifying information for the person depicted (e.g., name, age, date taken, etc.).

It is contemplated that alternative methods of applying the marking 80 to the plant leaf 20 may be employed without departing from the concepts disclosed herein. For example, the marking 80 may be applied to the plant leaf 20 with a stencil arrangement where the stencil arrangement prevents regions of the plant leaf 20 that are not intended for marking from being damaged by the marking process. In a similar, but alternative, manner, a material (e.g., a chemical) may be applied to a region of the plant leaf 20 that is intended for marking. This material may make the plant leaf 20 more susceptible to the marking process. For example, the material may absorb light of a given wavelength more strongly and thereby selectively heat the plant leaf 20. Additionally, or alternatively, the material may weaken or kill cells within one or more of the layers of the plant leaf 20 that were previously discussed.

Figure 10:
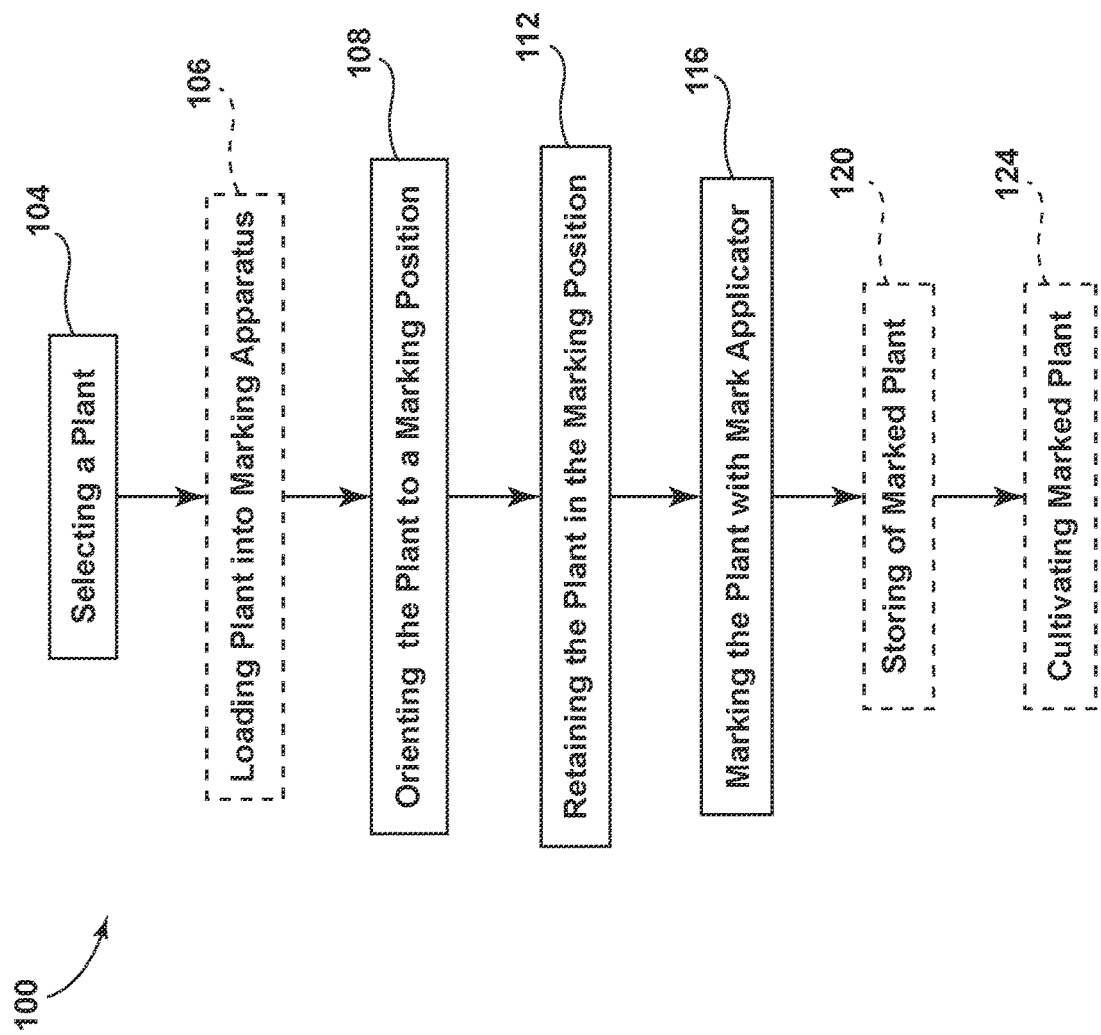
FIG. 10 is a flow diagram illustrating a method of marking living leaf tissue of a plant, according to one example.

Referring now to FIG. 10, a method 100 of marking living leaf tissue of a plant is shown according to one example. The method 100 may include step 104 of selecting a plant. For example, the plant that is selected at step 104 may be a succulent plant, which may include a *Hoya kerrii* plant. The method 100 may also include step 108 of orienting the plant such that the living leaf tissue is in a marking position. The marking position may be a position that is advantageous for the marking process. For example, the marking position may place the plant (e.g., the plant leaf 20) in a generally perpendicular relationship with the beam 68 of the laser 64 when the laser 64 is employed as the mark applicator 60. The method 100 may further include step 112 of retaining the living leaf tissue in the marking position. In some examples, the living leaf tissue may be actively retained in the marking position (e.g., by a grasping structure that engages the plant and/or a vessel that contains the plant). In various examples, the living leaf tissue may be passively retained in the marking position (e.g., by halting a conveyor belt or by gravity). The method 100 may also include step 116 of marking the living leaf tissue with the mark applicator 60. In various examples, marking the plant at step 116 can introduce a permanent deformation in the plant (e.g., the plant leaf 20).

In various examples, the step 116 of marking the plant with the mark applicator 60 can induce, or cause, a scar in the plant. In some examples, the step 116 of marking the plant with the mark applicator 60 may induce, or cause, an increase in a local temperature of a region of the plant to affect the marking 80. In various examples, the mark applicator 60 may be the laser 64. In such an example, a wavelength of light of the laser 64 may be chosen such that the wavelength of light is absorbed by a component of the plant, such as the living leaf tissue. Such absorption may result in an increase in the local temperature of the plant such that the marking 80 is applied. In some examples, the component of the plant that absorbs the wavelength of light of the laser 64 may be a mesophilic layer 32 of the plant. In various examples, the component of the plant that absorbs the wavelength of light of the laser 64 may be one or more of epidermal layer(s) of the plant (e.g., the first epidermal layer 28 and/or the second epidermal layer 36). In one specific example, the plant may be a *Hoya kerrii* plant.

In some examples, the step 116 of marking the plant with the mark applicator 60 may affect the marking 80 of the plant through abrasion. In various examples, the mark applicator 60 may be a physical tool. In some examples, the physical tool can include a blade. In various examples, the physical tool may be a rotary tool. In some examples, the method 100 of marking living leaf tissue of a plant may include loading the plant into a marking apparatus. The marking apparatus may include the mark applicator 60, a positioning system that orients the plant in the marking position, and/or a conveyance system that move to-be-marked plants into the marking position and already-marked plants out of the marking position. It is contemplated that the positioning system may include a depth-reading member, an orientation-adjusting member(s), and/or a position-evaluating member (e.g., camera and/or image evaluation software). In various examples, the method 100 of marking living leaf tissue of a plant may include storing the plant for a period of time. In some examples, the method 100 of marking living leaf tissue of a plant may include cultivating the plant. In various examples, the marking 80 applied to the plant may extend at least partially through the thickness 84 of the living leaf tissue of the plant. In one specific example, the marking 80 may extend entirely through the thickness 84 of the living leaf tissue of the plant.

The method 100 may additionally, or alternatively, include a step 106 of loading the entire plant, the plant and an associated planter, and/or the living leaf tissue of the plant into a marking apparatus prior to, or simultaneous to, the step 108 of orienting the plant into the marking position. The method 100 may further or alternatively include a step 120 of storing the plant for a period of time subsequent to marking the living leaf tissue, thereby allowing the plant to heal for a period of time prior to delivery or displaying the plant in an offer for sale, and further including a step 124 of cultivating the plant in particular growing conditions to maximize the healing and development of the plant subsequent to marking.

In the foregoing description, it will be readily appreciated by those skilled in the art that alternative embodiments of the various components and elements of the disclosed embodiments and modifications to the invention may be made without departing from the concepts disclosed herein. Such modifications are to be considered as included in the following claims unless these claims by their language expressly state otherwise.

The invention claimed is:

1. A method of marking living leaf tissue of a plant, comprising:
    providing a *Hoya* plant;
    orienting the *Hoya* plant such that the living leaf tissue of the *Hoya* plant is in a marking position;
    retaining the living leaf tissue in the marking position;
    providing a mark applicator that includes a laser;
    marking the living leaf tissue with the laser, wherein marking the living leaf tissue introduces a permanent deformation in the living leaf tissue, and wherein the laser deforms the living leaf tissue with an ultraviolet light to introduce the permanent deformation; and
    cultivating the *Hoya* plant subsequent to marking the living leaf tissue.

2. The method of claim 1, wherein the step of marking the living leaf tissue with the mark applicator induces a scar in the living leaf tissue.

3. The method of claim 1, wherein a component of the living leaf tissue that is deformed by the laser is a mesophilic layer of the living leaf tissue, and wherein layers of the living leaf tissue other than the mesophilic layer remain undeformed.

4. The method of claim 1, wherein a component of the living leaf tissue that is deformed by the laser is an epidermal layer of the living leaf tissue, and wherein layers of the living leaf tissue other than the epidermal layer remain undeformed.

5. The method of claim 1, wherein the *Hoya* plant includes a *kerrii* species.

6. The method of claim 1, further comprising:
    loading the *Hoya* plant into a marking apparatus.

7. The method of claim 1, further comprising:
    storing the *Hoya* plant for a period of time subsequent to marking the living leaf tissue.

8. A method of marking living leaf tissue of a plant, comprising:
    providing a *Hoya kerrii* plant that includes a root structure;
    loading the *Hoya kerrii* plant into a marking apparatus;
    orienting the *Hoya kerrii* plant such that the living leaf tissue of the *Hoya kerrii* plant is in a marking position;

retaining the living leaf tissue in the marking position;
providing a laser;
marking the living leaf tissue with a laser light applied by the laser while the living leaf tissue remains attached to the root structure, wherein marking the living leaf tissue introduces a permanent deformation of a surface of the living leaf tissue; and
cultivating the *Hoya kerrii* plant subsequent to marking the living leaf tissue.

9. The method of claim 8, wherein marking of the living leaf tissue introduces a permanent deformation of a mesophilic layer of the living leaf tissue, and wherein layers of the living leaf tissue other than the mesophilic layer remain undeformed.

10. The method of claim 8, wherein marking of the living leaf tissue introduces a permanent deformation of the epidermal layer of the living leaf tissue, and wherein layers of the living leaf tissue other than the epidermal layer remain undeformed.

11. The method of claim 8, wherein marking the living leaf tissue induces a scar in the living leaf tissue.

12. The method of claim 8, further comprising:
storing the plant for a period of time subsequent to marking the living leaf tissue.

13. A method of marking living leaf tissue of a plant, comprising:
selecting a plant, wherein the plant is a succulent plant;
orienting the plant such that the living leaf tissue of the succulent plant is in a marking position;
retaining the living leaf tissue in the marking position;
providing a mark applicator;
marking the living leaf tissue with a laser light from a laser, wherein marking the living leaf tissue introduces a permanent deformation in the living leaf tissue; and
cultivating the plant after marking the living leaf tissue.

14. The method of claim 13, wherein the light is within a wavelength range of between 150 nm and 400 nm.

15. The method of claim 14, wherein the light is within a wavelength range of between 250 nm and 375 nm.

16. The method of claim 15, wherein the wavelength is about 355 nm.

17. The method of claim 13, wherein a component of the living leaf tissue that is deformed is a mesophilic layer of the living leaf tissue.

18. The method of claim 13, wherein a component of the living leaf tissue that is deformed is an epidermal layer of the living leaf tissue.

19. The method of claim 13, wherein the plant is a *Hoya* plant.

20. The method of claim 19, wherein the plant is a *Hoya kerrii* plant.

* * * * *